(12) United States Patent
Molaro (10) Patent No.: US 8,983,967 B2
(45) Date of Patent: Mar. 17, 2015

(54) DATA STORAGE SYSTEM HAVING MUTABLE OBJECTS INCORPORATING TIME

(71) Applicant: DataDirect Networks, Inc., Chatsworth, CA (US)

(72) Inventor: Donald Molaro, Cupertino, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 260 days.

(21) Appl. No.: 13/841,379

(22) Filed: Mar. 15, 2013

(65) Prior Publication Data

US 2014/0280187 A1    Sep. 18, 2014

(51) Int. Cl.
*G06F 17/30*    (2006.01)

(52) U.S. Cl.
CPC .............................. *G06F 17/30321* (2013.01)
USPC .......................................................... 707/741

(58) Field of Classification Search
CPC ..................... G06F 17/30864; G06F 17/30321
USPC .......................................................... 707/741
See application file for complete search history.

(56) References Cited

U.S. PATENT DOCUMENTS

| 7,818,430 | B2 |   | 10/2010 | Zuckerman et al. |         |
|-----------|----|---|---------|------------------|---------|
| 7,836,029 | B2 | * | 11/2010 | Shoens           | 707/695 |
| 8,423,517 | B2 | * | 4/2013  | Kesselman et al. | 707/689 |
| 8,615,485 | B2 | * | 12/2013 | Yonatan et al.   | 707/610 |
| 8,775,390 | B2 | * | 7/2014  | Anglin et al.    | 707/693 |
| 8,788,769 | B2 | * | 7/2014  | Abercrombie et al. | 711/162 |

* cited by examiner

*Primary Examiner* — Rehana Perveen
*Assistant Examiner* — Hicham Skhoun
(74) *Attorney, Agent, or Firm* — SoCal IP Law Group LLP; Mark A. Goldstein (57) ABSTRACT

A data storage system having mutable objects incorporating time is described herein. According to the systems and methods described herein, a data item may be partitioned into parts (data objects) and stored as an index object. As the object storage system provides immutable objects, when a new version of a data item needs to be stored, only those parts (data objects) of the data item that changed need be saved rather than the entire data item. The systems and methods described herein allow for efficient storage, access and manipulation of mutable data items using an underlying immutable object system.

9 Claims, 7 Drawing Sheets

Index Object 310

```
<Version>
<Policy>
<Timestamp>
<Parent ID>
<Reference Count>
<Meta data size>
<Data size>
<Meta Data Obj Count>
<Data Obj count>
{OID of metadata object}
(Offset[1], length[1], OID[1], hash[1])
(Offset[2], length[2], OID[2], hash[2])
...
(Offset[n], length[n], OID[n], hash[n])
```

© 2013 DataDirect Networks

Index Object 310

<Version>
<Policy>
<Timestamp>
<Parent ID>
<Reference Count>
<Meta data size>
<Data size>
<Meta Data Obj Count>
<Data Obj count>
{OID of metadata object}
(Offset[1], length[1], OID[1], hash[1])
(Offset[2], length[2], OID[2], hash[2])
...
(Offset[n], length[n], OID[n], hash[n])

DATA STORAGE SYSTEM HAVING MUTABLE OBJECTS INCORPORATING TIME

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to data stored in an object storage system and a method for storing and accessing immutable objects as if they were mutable by using time information and hashing with objects in the object storage system.

2. Description of the Related Art

A file system is used to store and organize computer data stored as electronic files. File systems allow files to be found, read, deleted, and otherwise accessed. File systems store files on one or more storage devices. File systems store files on storage media such as hard disk drives and silicon storage devices. In contrast, the system described herein involves data items stored as a plurality of objects in an object storage system. Object storage systems may provide a simpler instruction set and improved storage and access efficiencies compared to a traditional file system. Applications may store large numbers of documents, images, audio, videos and other data items as a plurality of objects using an object storage system.

DETAILED DESCRIPTION

Environment

Figure 1:
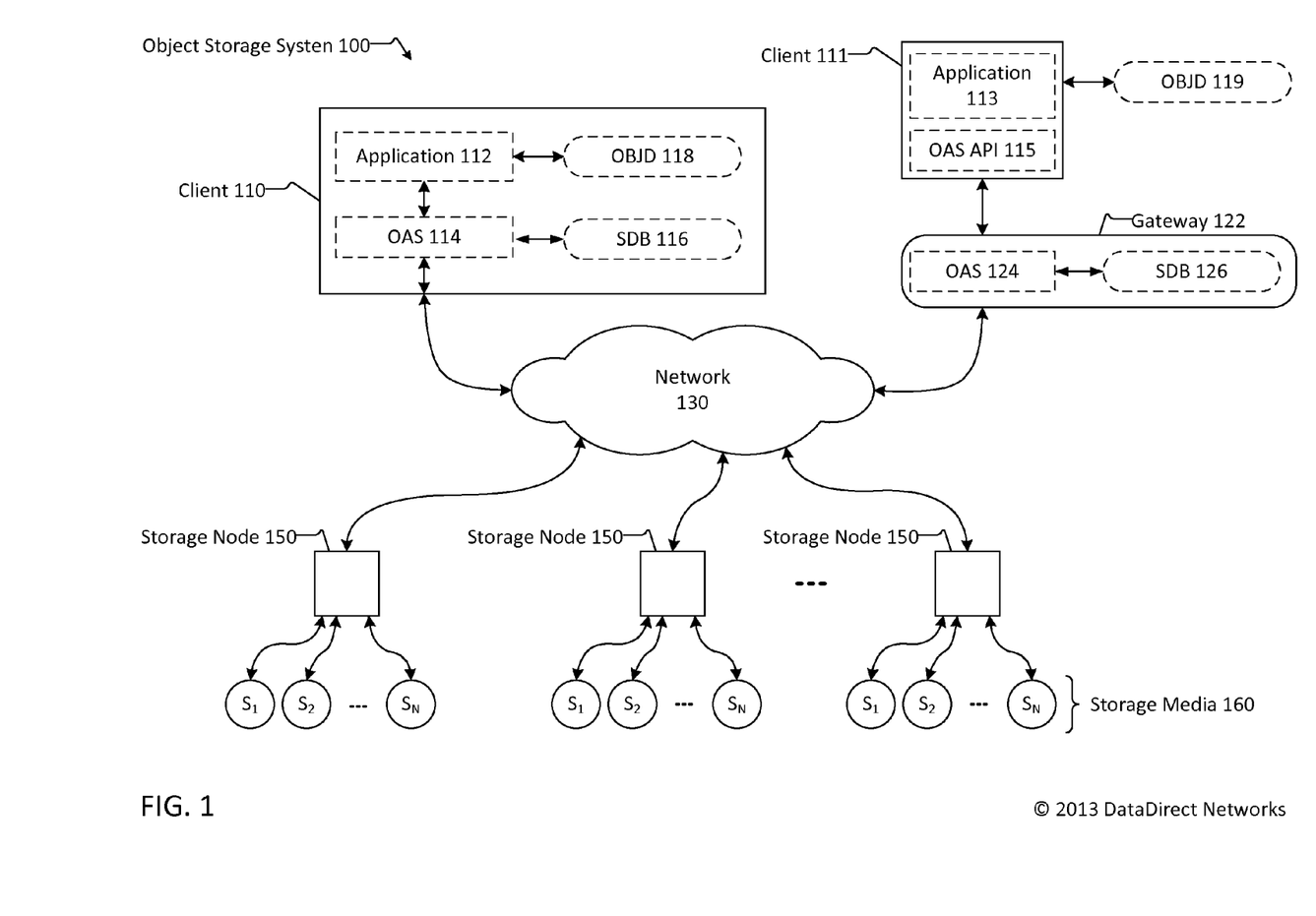
FIG. 1 is a block diagram of an object storage system.

FIG. 1 is a block diagram of an object storage system 100. The object storage system 100 includes at least one and typically multiple storage nodes 150. In some configurations, the storage nodes are arranged in groups into storage zones that may be at different and separate geographical locations. The object storage system 100 includes storage nodes 150 that are independent of one another, may be geographically dispersed and are in a peer-to-peer configuration.

The storage nodes 150 communicate with each other and share objects over network 130. The network 130 may be or include the Internet and may be or include one or more local area networks that may be private and secure. The network 130 may be wired, wireless, or a combination of these. The network 130 may be public or private, may be a segregated network, and may be a combination of these. The network 130 includes networking devices such as routers, hubs, switches and the like.

Many data intensive applications store a large quantity of data. These applications include scientific applications; applications used by insurance providers, banks, government agencies; newspaper and magazine websites (for example, nytimes.com and life.com); scientific lab data capturing and analysis programs; video and film creation software; and consumer web based applications such as social networking websites (for example, FACEBOOK), photo sharing websites (for example, FLIKR), video sharing websites (for example, YOUTUBE) and, media distribution websites (for example, ITUNES).

The term data as used herein includes a bit, byte, word, block, stripe or other unit of information. As used herein, the term data is inclusive of entire computer readable files or portions of a computer readable file. The data may include or represent text, numbers, data, images, photographs, graphics, audio, video, computer programs, computer source code, computer object code, executable computer code, and/or a combination of these and similar information. A data item refers to a single computer readable file. A data item may be stored as a plurality of objects. Objects may include a plurality of sub-objects which are in and of themselves objects.

The object storage system provides only limited access to stored objects. Only a limited command set is supported by the object storage system. The object storage system described herein supports only three commands: put (that is, write or store or set), get (that is, read) and delete. The object storage system may also support two additional commands: reserve to reserve space for an object, and reserve write to write the reserved object. To read, write and delete data stored on the object storage system, an application program 112/113 may communicate with an object access system (OAS) program 114 on the client 110 or use an OAS application program interface (API) module 115 to communicate with an OAS program 124 on a gateway 122. The application program 112/113 makes calls to or uses the object access system 114 or the combination of the OAS API 115 and OAS 124 to read, write and delete objects stored on the storage nodes 150. The OAS 114 and the OAS API 115 may provide a proprietary or well-known standards based interface to the applications 112 and 113.

As the object storage system provides only limited access to objects, the objects in the system described herein are considered immutable; that is, they are unchangeable, cannot be modified or augmented, and cannot be amended, namely, enlarged or truncated. In contrast, mutable objects are objects that may be amended and augmented, namely enlarged or truncated. In certain circumstances having only immutable objects is problematic. For example, applications may wish to keep multiple versions of a data item with a portion of different information included in each data item even though another portion of the data items remain unchanged, the same. In traditional storage systems, entire versions of data items are stored. The traditional systems cause a relatively large storage footprint as full copies of each version of each data item must be stored. In addition, a relatively large amount of overhead is incurred in the form of processing and access time when an application wishes to switch between multiple versions of a data item. The systems and methods described herein allow for an application to efficiently store, access and manipulate mutable objects using an underlying immutable object system.

The object storage system 100 stores objects on storage nodes 150. To implement the mutable objects methods described herein, in one version of the system, the storage nodes 150 in the object storage system 100 are synchronized. In this version of the system a clock is used to keep a uniform time in all of the storage nodes 150 in the object storage system 100. In another version, a vector clock technique or other timestamp technique is used to obtain pertinent time data.

Groups of storage nodes 150 within object storage system 100 may be configured into zones. Each zone may be connected via a local area network by wire lines, optical fiber cables, wireless communication connections, and others, and a combination of these. The local area network may include one or more networking devices such as routers, hubs, switches and the like.

The application 112/113 may read, write and delete information about stored data items and their corresponding object identifiers in an object information database OBJD 118/119 included on or coupled with the client 110/111. The object information database OBJD 118/119 may be on a database server directly coupled to the client 110/111 (as shown) or accessible over network 130.

The object access software 114/124 may store storage node and other storage system information in a storage database SDB 116/126 included in or coupled with (as shown) the object access software 124 on client 110 and/or the object access software 124 on gateway 122. The object access software 114/124 maintains information about latencies to/from storage nodes and/or storage zones, and other pertinent object management system information in the storage databases SDB 116/126.

One storage node in one of the storage zones may include an object management system and/or application program that manages the storing and retrieval of objects in the storage nodes 150. The storage system 100 may include one or more computing devices and/or a controller on which software may execute to implement the methods described herein. The computing device and/or controller may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the computing device and/or controller may include various specialized units, circuits, software and interfaces for providing the functionality and features described herein. The processes, functionality and features described herein may be embodied in whole or in part in software which operates on a controller and/or one or more computing devices and may be in the form of one or more of firmware, an application program, object code, machine code, an executable file, an applet, a COM object, a dynamic linked library (DLL), a script, one or more subroutines, or an operating system component or service, and other forms of software. The hardware and software and their functions may be distributed such that some actions are performed by a controller or computing device, and others by other controllers or computing devices within a storage zone.

The client 110/111 of the object storage system 100 may be a computing device such as, for example, a personal computer, tablet, mobile phone, workstation or server. A computing device as used herein refers to any device with a processor, memory and a storage device that may execute instructions such as software including, but not limited to, server computers, personal computers, portable computers, tablets, cellular telephones, wrist watches, eyeglasses with a display, and laptop computers. The computing devices may run an operating system, including, for example, versions of the Linux, Unix, Microsoft Windows, Solaris, Symbian, Android, Chrome, Firefox OS, and Apple Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND® network, Fibre Channel, and others. A computing device with a network interface is considered network capable.

Each storage node 150 includes a plurality of storage media 160. Each of the storage nodes 150 may include one or more server computers. Each of the storage nodes 150 may be an independent network attached storage (NAS) device or system. The term "storage media" is used herein to refer to any configuration of hard disk drives (HDDs), solid-state drives, silicon storage devices (SSDs), magnetic tape, or other similar storage media. Hard disk drives and/or other storage media 160 may also be arranged in the storage nodes 150 according to any of a variety of techniques.

The storage media included in a storage node may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 500 Mbytes, 1 terabyte and 2 terabytes. Example hard disk drive specifications include Serial Attached Small Computer System Interface (SAS), Serial Advanced Technology Attachment (SATA), and others. An example storage node may include 16 one terabyte 3.5" hard disk drives conforming to the SATA standard. In other configurations, the storage nodes 150 may include more and fewer drives, such as, for example, 10, 12, 24 32, 40, 48, 64, etc. In other configurations, the storage media 160 in a storage node 150 may be hard disk drives, solid-state drives, silicon storage devices, magnetic tape devices, or a combination of these. In some embodiments, the physical size of the media in a storage node may differ, and/or the hard disk drive or other storage specification of the media in a storage node may not be uniform among all of the storage devices in a storage node 150.

The storage media 160 in a storage node 150 may be included in a single cabinet, rack, shelf or blade. When the storage media in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In another embodiment, multiple storage nodes 150 are included in a single cabinet or rack such that a storage zone may be included in a single cabinet. When in a single cabinet or rack, storage nodes and/or constituent storage media may be coupled with a backplane. A controller may be included in the cabinet with the storage media and/or storage nodes. The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage zone may include a communications interface that allows for connection to other storage zones, a computing device and/or to a network. The rack, shelf or cabinet containing a storage node 150 may include a communications interface that allows for connection to other storage nodes, a computing device and/or to a network. The communications interface may allow for the transmission of and receipt of information according to one or more of a variety of standards, including, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing a storage zone may include a network interface chip, chipset, card or device that allows for communication over a wired and/or wireless network, including Ethernet. The backplane or controller in a rack or cabinet containing one or more storage nodes 150 may include a network interface chip, chipset, card or device that allows for communication over a wired and/or wireless network, including Ethernet. In various embodiments, the storage zone, the storage node, the controller and/or the backplane may provide for and support 1, 2, 4, 8, 12, 16, etc. network connections and may have an equal number of network interfaces to achieve this.

The techniques discussed herein are described with regard to storage media including, but not limited to, hard disk drives and solid-state drives. The techniques may be implemented with other readable and writable storage media.

As used herein, a storage device is a device that allows for reading from and/or writing to a storage medium. Storage devices include hard disk drives (HDDs), solid-state drives (SSDs), DVD drives, BLU-RAY® drives, flash memory devices, and others. Storage media include magnetic media such as hard disks and tape, flash memory, and optical disks such as CDs, DVDs and BLU-RAY® discs.

In object storage system 100, data items are partitioned into portions and stored as multiple objects among multiple storage media 160 in a storage node 150, and may be spread among multiple storage nodes in a zone or among multiple storage nodes in multiple geographical locations.

Figure 2:
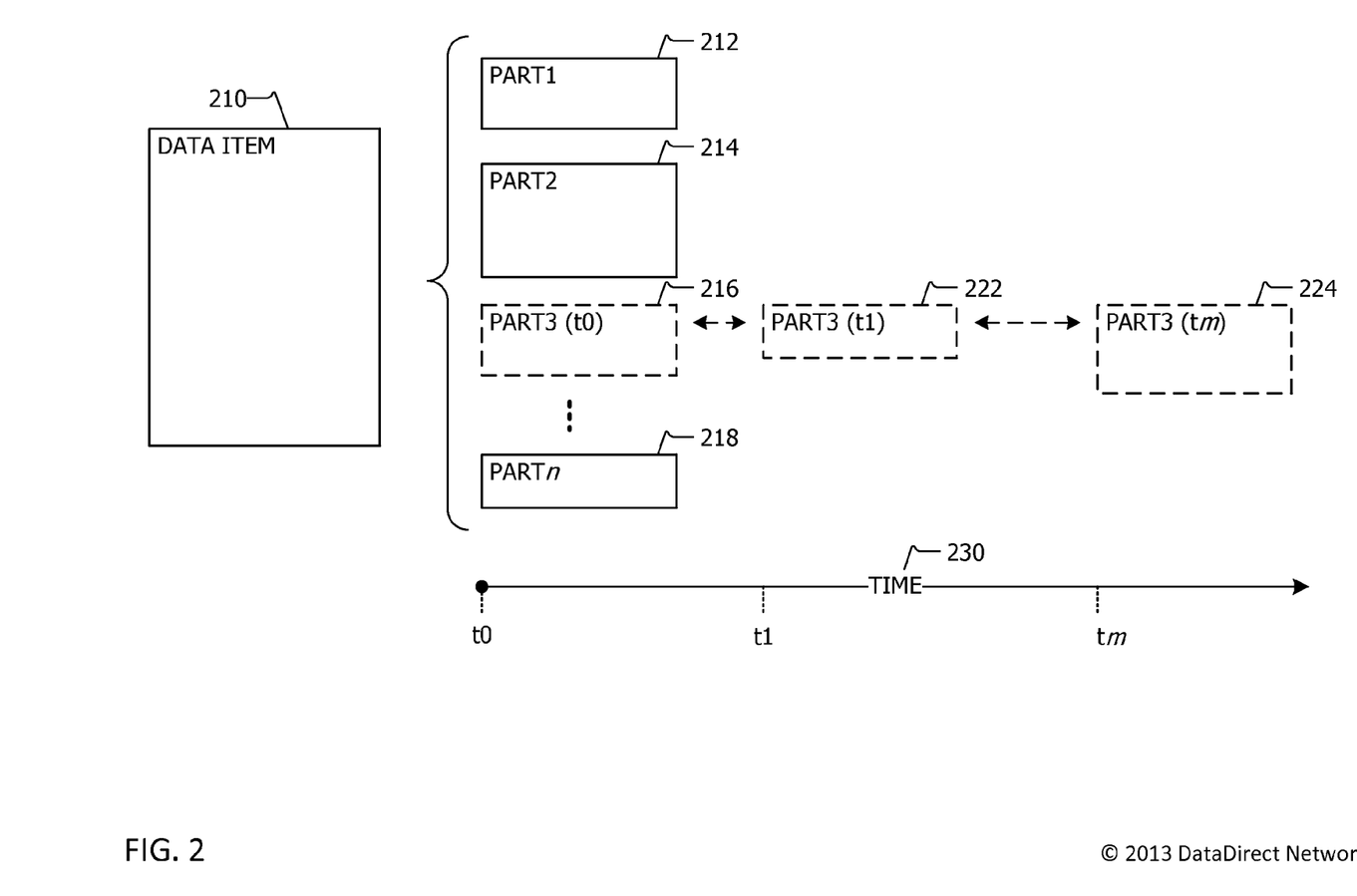
FIG. 2 is a conceptual block diagram of a data item and constituent objects according to the object storage system.

Referring now to FIG. 2, there is shown a conceptual block diagram of a data item 210 and constituent parts, that is, data objects, over time 230. According to the systems and methods described herein, a data item may be partitioned into parts (data objects) and stored as an index object. As the object storage system provides immutable objects, when a new version of a data item needs to be stored, only those parts of the data item that changed need be saved rather than the entire data item. In traditional systems, entire versions of data items of all versions of data items are stored. The traditional systems cause a relatively large storage footprint as full copies of each version of each data item are stored. In addition, in traditional systems a relatively large amount of overhead is incurred in the form of processing and access time when an application wishes to switch between multiple versions of a data item. The systems and methods described herein allow for efficient storage, access and manipulation of mutable data items using an underlying immutable object system. This is shown by reference to the conceptual block diagram depicted in FIG. 2.

Data item 210 may be partitioned into parts such as PART1 212, PART2 214, PART3 (t0) 216, through PARTn 218 (where n is an integer) when the data item is initially stored at time t0. When a change is made to the data item 210 and it needs to be stored the system recognizes those parts that have changed and stores only those changed parts. In the example shown in FIG. 2, PART3 is changed or modified at times t1 and tm (where tm is a time after t1). As such, when the data item is stored at times t1 and tm the system stores PART3 (t1) 222 and PART3 (tm) 224. This differs from prior systems which would have required storing of the entire data item or all constituent parts of the data item rather than only the changed parts of the data item. The systems and methods described herein allow for more efficient access to multiple versions of a data item while using immutable objects. Each of the parts of the data item may be different sizes. Each of the versions of parts of the data item may be different sizes. To implement the mutable data storage system using immutable objects, each of the parts of the data items are stored as data objects and an index object includes reference to time of creation and reference to an earlier versions of the data item that includes at least one different parts (that is data objects). The index object keeps a list of all data objects for the data item. Whenever a data item is modified, a new index object is created. Instead of storing multiple full versions of data items, the systems and methods create multiple index objects with varying contents that refer to the differing constituent data objects for each of the parts of the data item. The data objects and index objects are show in FIGS. 3, 4 and 5 described below.

Figure 3:
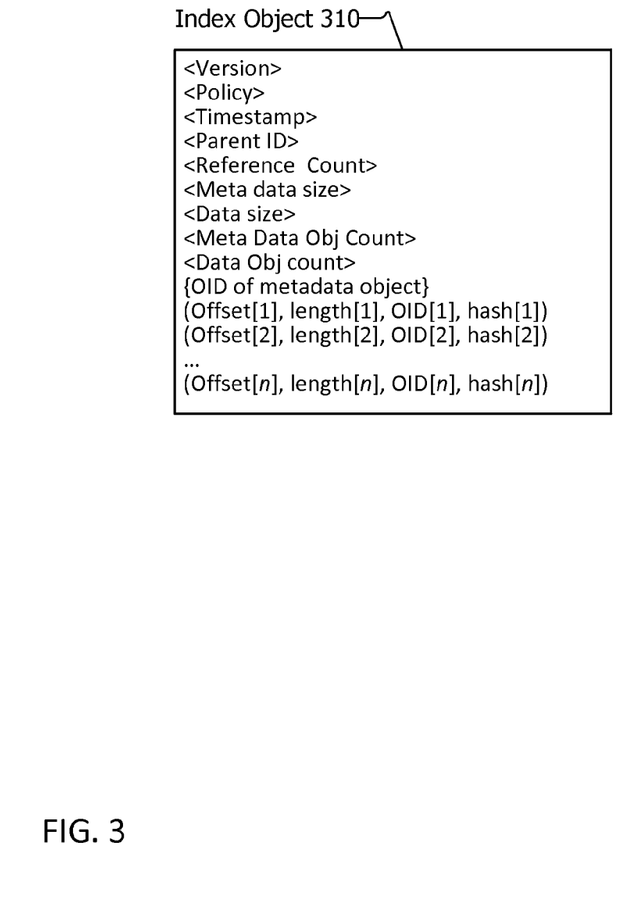
FIG. 3 is a block diagram of an index object used in an object storage system.

Referring now to FIG. 3, there is shown a block diagram of an index object 310. The index object includes fields and information about all constituent objects for a data item. The index object includes multiple fields including a "version" field and a "policy" field. The <Version> field includes an identifier of the version of the system. This may be numbers, letters or a combination thereof. This filed is optional and may be excluded in some versions of the system, The <Policy> field is a storage policy identifier for the data item. The index object including its constituent data portion is stored among storage nodes (and storage zones) according to the storage policy specified by the storage policy identifier included in the index object.

Various policies may be maintained and distributed or known to the nodes in the distributed replicated storage system. Policies define the replication and placement of data objects and index objects in the data storage system. Example policies include, full distribution, single copy, single copy to a specific zone, copy to all zone but a specified zone, and others. The policies may be stored on and distributed from a client or server to the object storage system to all nodes in the storage system. A character (e.g., A, B, C, etc.) or number (0, 1, 2, etc.) or combination of one or more characters and numbers (A1, AAA, A2, BC3, etc.) or other scheme may be associated with and used to identify each of the policies.

Importantly, each index object includes a <Timestamp>. In one version of the system, the timestamp is a system generated time specification. In this version of the system, the time for the system is synchronized among all nodes in the object storage system. Each node may keep its own time using its own clock but synchronization is made to a primary or lead storage node, to a client, or to a remote time server. In one version of the system, time may be maintained and synchronized using the Network Time Protocol (NTP) or other network time synchronization techniques.

In another version, the timestamp may be implemented using a vector clock or other counting and tracking technique. In this version of the system, the timestamp may include pertinent time data such as a timestamp based on the particular implementation of a time tracking or counting technique.

In the index object, <Parent ID> refers to the identifier of the index object for the most recent prior version of the data item or of a data object itself. Including the parent object identifier allows for easily providing historical versions of the current data item and current data object. When the patent object identifier is set to NULL or a system defined code, that current index object is the earliest, original or first index object for the data item.

<Reference Count> in the index object refers to the number of objects that refer to this version of the object. When one or more constituent data objects of an index object are modified, a new index object is created and the reference count in the earlier, older index object is incremented (updated).

<Meta data size> refers to the number of bytes of meta data that is associated with this index object. Meta data is optional and meta data size is an optional field not required for some versions of the system described herein.

<Data size> is the size, in bytes (or kilobytes), in total of the data item represented by this index object.

<Meta Data Obj Count> is the number of meta data objects associated with this index object. Meta data is optional and the meta data object count is an optional field not required for some versions of the system described herein.

<Data Obj count> is the number of data objects associated with the data item represented by the index object.

{OID of metadata object} is a list of object identifiers that contain meta data for the data item represented by this index object. Meta data is optional and the meta data object list is an optional field not required for some versions of the system described herein.

Last, the index object includes a listing of all objects included in the data item, the constituent objects. For each data object, an offset, length of the object (in bytes, for example), the OID for the object, and a hash for the object are provided. A hash of the object provides a unique identifier based on the contents, that is, the data portion, of the particular data object. An evaluation of whether the data portion for a data object is the same as or differs from the data portion for another data object may be made by performing a hash on the data portions for the data objects and comparing the hashes. This is much quicker than performing a bit by bit comparison of the data portions for the data objects.

Figure 4:
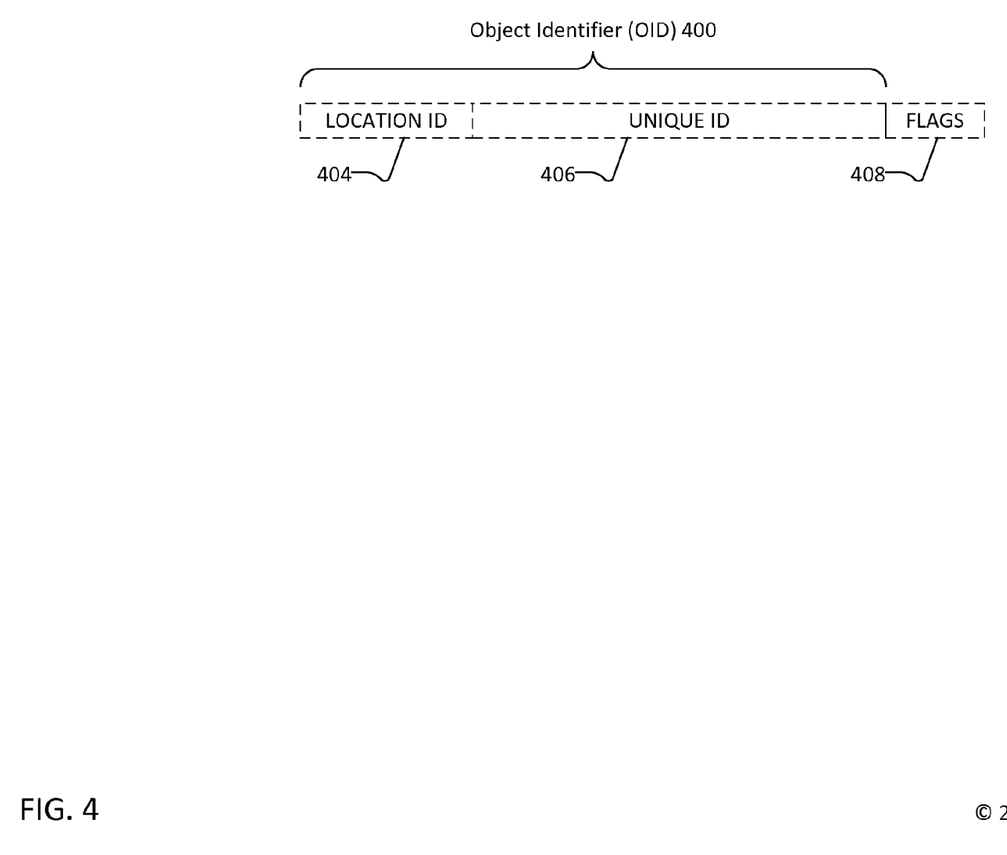
FIG. 4 is a block diagram of an object identifier used in the object storage system.

Referring now to FIG. 4, a block diagram of an object identifier used in the object storage system is shown. According to the object storage system described herein, an object identifier 400 includes two components and may include three or more components. The object identifier 400 includes a location identifier 404 and a unique identifier 406. The object identifier 400 may optionally include flags 408 and other fields. The location identifier 404 specifies a device, address, storage node or nodes where an object resides. The specific format of the location identifier may be system dependent.

In one version of the system, the location identifier 404 may include both a group identifier ("group ID") and an index. The group ID may refer to a grouping of objects. The grouping may be arbitrary or may reflect that those objects are stored in a related the same region, such as, for example, on a particular storage node or on a particular storage media such as a drive or storage device. The group ID may represent a collection of objects stored under the same replication policy, stored on a same node. The group ID may be used to map the object to a particular storage node or storage media, such as a hard disk drive. The mapping may be stored in a mapping table maintained by the object storage system. The mapping information is distributed and is hierarchical. More specifically, the OAS stores a portion of mapping information in memory, and the storage nodes hold a portion of the mapping information in their memory. Master copies of the mapping information are kept on disk or other nonvolatile storage medium on the storage nodes. The master copies of the mapping information are dynamically updated to be consistent with any changes made while the system is active. The index may be the specific location of the object within the group. The index may refer to a specific location on disk or other storage device.

The unique identifier 406 is a unique number or alphanumeric sequence that is used to identify the object on the particular medium. The unique identifier 406 may be randomly generated, may be the result of a hash function of the object, or may be created using another technique. In one embodiment the unique identifier is assigned by the controller in such a manner that the storage media is used efficiently. The unique identifier 406 may be stored as 24 bits, 32 bits, 64 bits, 128 bits, 256 bits, 512 bits, 1 kbyte, etc. The total size of the object identifier may be, for example, 128 bits, 256 bits, 512 bits, 1 kbyte, 4 kbytes, etc. In the one embodiment, the total size of the object identifier includes the sum of the sizes of the location identifier, unique identifier, flags, policy identifier, and version id. In other embodiments, the object identifier includes additional data that is used to obfuscate the object identifier. The unique identifier 406 is stored within the object identifier itself.

The object identifier 400 may optionally include flags 308. Flags 408 may be used to distinguish between different object types by providing additional characteristics or features of the object. The OAS may use the flags in evaluating whether to retrieve or delete objects. In one embodiment, the flags associated with the object indicate if the object is to be preserved for specific periods of time, or to authenticate the client to ensure that there is sufficient permission to access the object.

The data object, index objects and meta data objects may all be referenced by OIDs like those shown and described regarding FIG. 4. In other embodiments, other kinds and formats of OIDs may be used.

In some embodiments, when the data objects are large, the data object may be partitioned into sub-objects. The flags 408 may be useful in the handling of large data objects and their constituent sub-objects. Similarly, the group ID that may be included as part of the location ID 404, and may be used in mapping and reassembling the constituent parts of large data objects.

Figure 5:
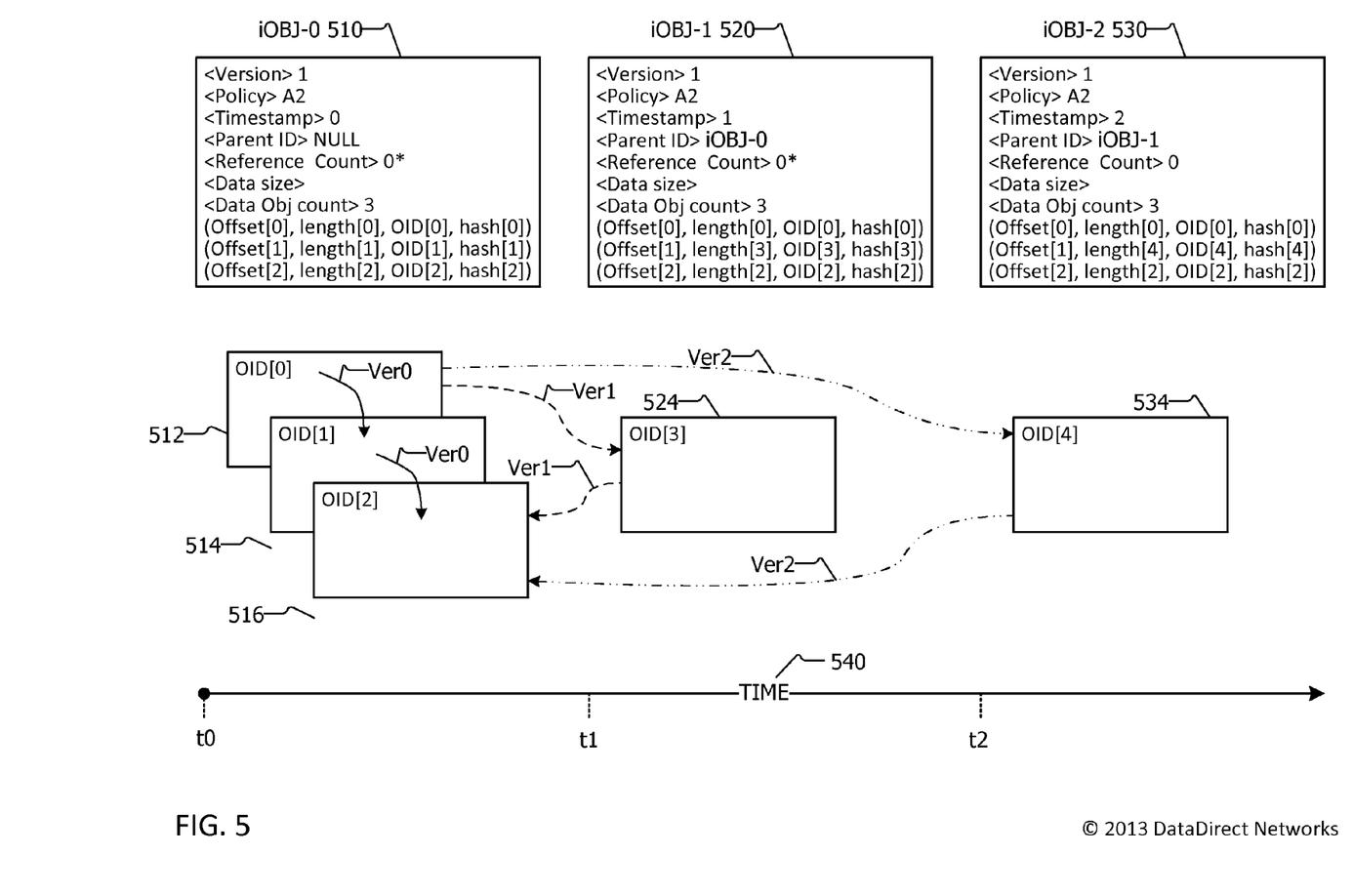
FIG. 5 is a block diagram of example index objects and constituent data objects in the object storage system.

FIG. 5 is a block diagram of example index objects and constituent data objects in the object storage system. As shown in this example, when a data item is to be stored, the first or original time t0 the data item is stored, each of objects OID[0], OID[1] and OID[2] are referenced in the index object iOBJ-0 510. As iOBJ-0 510 is the original or first index object for the data, item, the parent OID is NULL. Similarly, as no other index objects refer to iOBJ-0 yet, the reference count is 0. The arrangement of the original version Ver0 of the objects OID[0], OID[1] and OID[2] is shown by the arrows and arrangement of blocks 512, 514 and 516 which is specified in index object iOBJ-0 510.

At a later time t1 when a modified version, version Ver1, of the data item is stored, iOBJ-1 520 is created referring to the originally stored first and third objects having OID[0] 512 and OID[2] 516 but replacing a reference to the second object OID[1] 514 with a reference to a newly created fourth object OID[3] 524. The reference count value in iOBJ-0 is incremented to reflect that another index object (iOBJ-1) now refers to iOBJ-0. (The drawing shows 0* to signify that the reference count is originally 0 but is later changed when new index objects refer to it.) The arrangement of version Ver1 of the objects OID[0], OID[3] and OID[2] of the modified data item is specified in iOBJ-1 520 and shown conceptually by the dashed line labeled Ver1.

At a later time t2 when a modified version, version Ver2, of the data item is stored, iOBJ-2 520 is created referring to the originally stored first and third objects having OID[0] 512 and OID[2] 516 but replacing a reference to the second object with a reference to a newly created fifth object OID[4] 534. The reference count value in iOBJ-1 is incremented to reflect that another index object (iOBJ-2) now refers to iOBJ-1. (The drawing shows 0* to signify that the reference count is originally 0 but is later changed when new index objects refer to it.). The arrangement of version Ver2 of the objects OID[0], OID[4] and OID[2] of the modified data item is specified in iOBJ-2 530 and shown conceptually by the dotted and dashed line labeled Ver2.

Each of the amended index objects also includes a timestamp that refers to the time the index object was created and its constituent objects were stored as well as a parent object identifier. The parent OID allows for the relatively easy historical view of versions of a data item by traversing the parent OIDs in the index objects for the data item.

In another version of the system, a Child OID may be included in the index objects so that versions of the data items may be traversed between newer and older versions of the data item. The Child OID may be updated when the reference count for an index object is updated. An index object may have multiple children when a data item is concurrently modified. To allow for this, a Child OID Count and a listing of Child OID may be included in an index object.

DESCRIPTION OF PROCESSES

Figure 6:
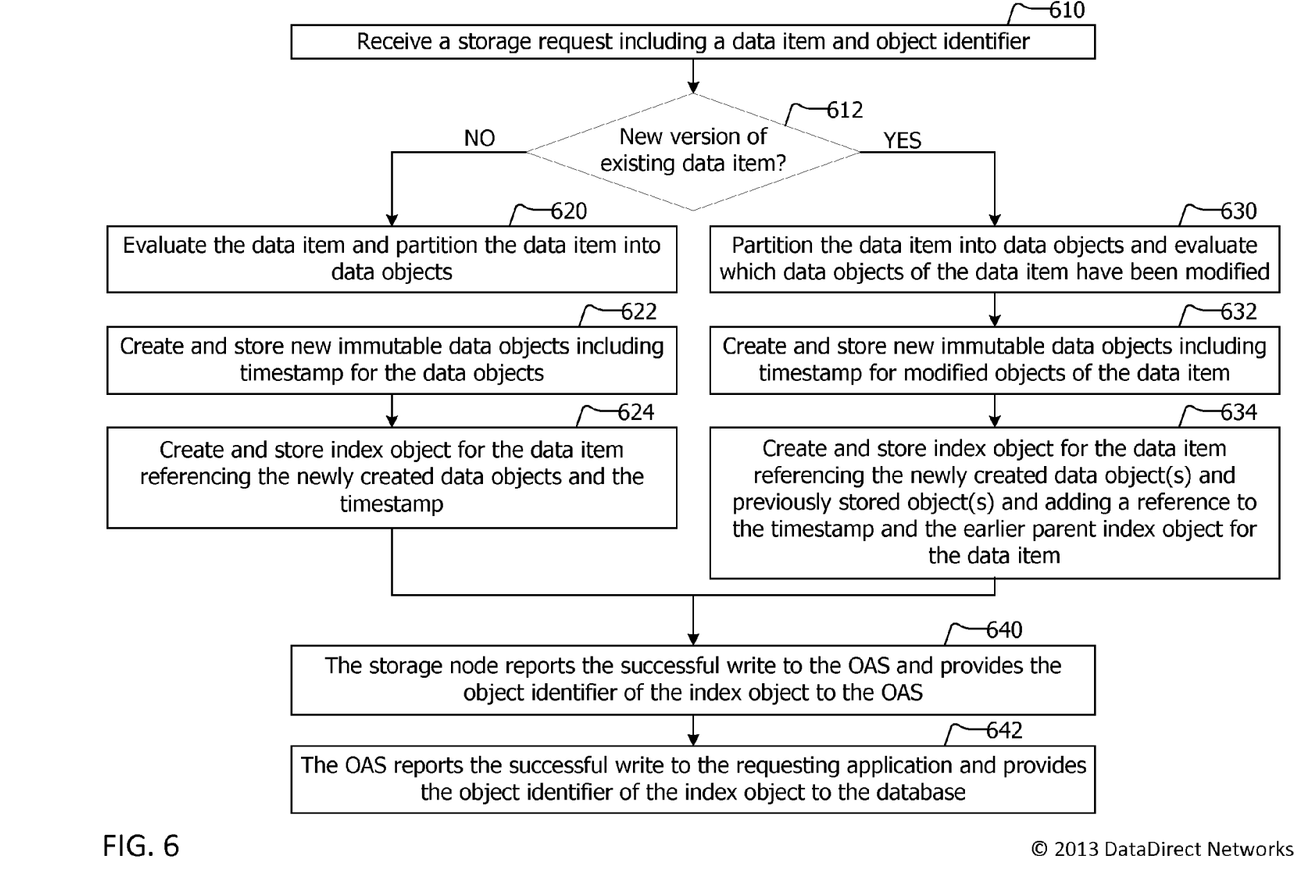
FIG. 6 is a flow chart of the actions taken to store or put a data item in an object storage system.

Referring now to FIG. 6, a flow chart of the actions taken to store or put a data item in an object storage system is shown. To store or put a data item, the system receives a storage request that includes a data item or reference or link to a data item and may include an object identifier for an index object and storage criteria, as shown in block 610. The object identifier for an index object is provided when the data item to be stored is a modified version of an earlier stored data item. The storage criteria may, in different embodiments, specify the storage policy for the data item by a code or name, or may include specific distribution instructions for the data item.

The system evaluates whether the storage request is for a new version of an existing data item, as shown in block 612. When the storage request is for a data item not yet stored in any version in the system, the flow of actions continues at block 620 where the system evaluates the data item and partitions the data item into data objects. The partitioning into data objects may be achieved according to any number of applicable techniques and may include erasure coding techniques. The system creates and stores new immutable data objects including obtaining a timestamp for the new data object(s), as shown in block 622. The system then creates and stores an index object for the data item, the index object referencing the newly created objects and the timestamp for the new data object(s), as shown in block 624. In another embodiment, the timestamp for when the index object is created and stored may be used in place of the timestamp for the creation of the new data object(s).

When the storage request is for a new version of a data item already stored in the system, the flow of actions continues at block 630 where the system partitions the data item into data objects and evaluates which objects of the data item have been modified. The comparison may be made by using existing hash values for already stored data objects as designated in the parent object identifier, and computing a hash on data objects of the newly submitted data items. A hash of the data object provides a unique identifier based on the contents, that is, the data, of the particular object. Evaluation of whether data for an object is the same as or differs from data for another object may be made by comparing the hashes on the data objects. This is much quicker than performing a bit by bit comparison of the data for the data objects.

The system creates and stores new immutable data objects including obtaining a timestamp for modified data objects of the data item, as shown in block 632. The system then creates and stores an index object for the data item referencing the newly created data object or objects and previously stored data objects, adding the timestamp for the new data object(s) and adding a reference to parent (earlier) index object for the data item, as shown in block 634. In another embodiment, the timestamp for when the index object is created and stored may be used in place of the timestamp for the creation of the new data object(s). Including the parent index object reference allows for easy retrieval of multiple versions of data items.

When an amended, truncated or modified version of a data item needs to be stored, the system creates a new index object similar to the earlier one provided with the storage request and changes references only to those data objects that have changes. There is a certain amount of computing required to evaluate which data objects have been modified based on comparison of the hash values of data objects (block 630), but this is typically much quicker than storing for a second time (or multiple times) all objects the entire data item, and much less data is required when all data items stored by the system are considered.

In some embodiments after block 624 and after block 634, the storage node reports the successful write to the OAS and provides the object identifier of the index object to the OAS, as shown in block 640. In some embodiments, the OAS reports the successful write to the requesting application and provides the object identifier of the index object to the database, as shown in block 642.

Figure 7:
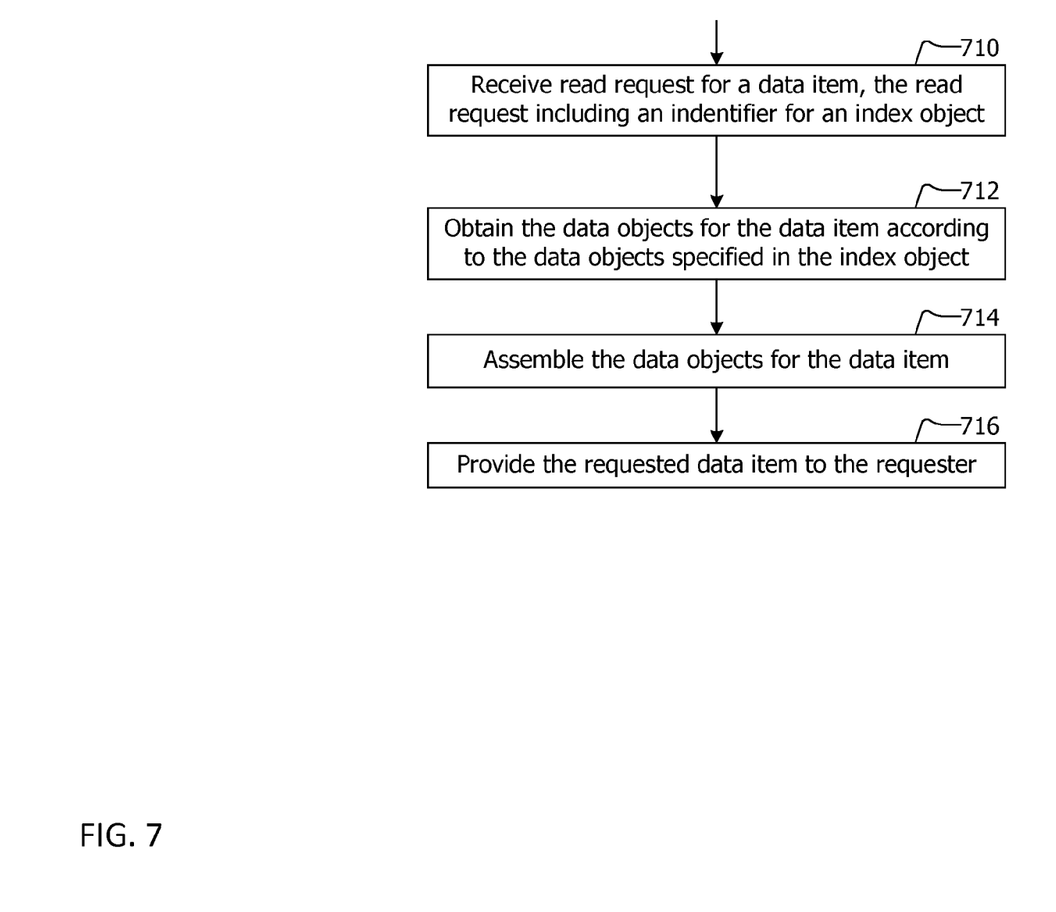
FIG. 7 is a flow chart of the actions taken to read or get a data item included in an object storage system.

Referring now to FIG. 7, a flow chart of the actions taken to read or get data included in an object storage system is shown. The system receives a read request for a data item, the read request including an index object identifier for an index object as shown in block 710. The system obtains the data objects for the data item according to the data objects specified in the index object, as shown in block 712. The system assembles the data objects for the data item, as shown in block 714. The system provides the requested data item to the requester, as shown in block 716. When providing the requested data item, a link to a location in memory where the data item is stored is typically provided.

The system then constructs the data item from data objects obtained from nodes identified in the index object, as shown in block 632. The system provides the requested data item to the requester, as shown in block 650.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A storage system comprising:
   a first node of a plurality of storage nodes, the storage nodes including a plurality of storage devices allowing for storing immutable objects including data objects and index objects, the first node having instructions which when executed cause a first processor included in a first controller in the first node to perform actions including:
   receiving a storage request from a client of the system to store a data item
   evaluating whether the data item was earlier stored
   when the data item was not earlier stored,
      partitioning the data item into a plurality of data objects, each object including an object identifier, a timestamp and a data portion
      creating a first index object for the data item, the first index object including an index object identifier, a timestamp and a list of constituent data objects, the list of constituent data objects including an object identifier and a hash for each data object
      storing the first index object and the plurality of data objects
   providing an object identifier for the first index object to the client when the data item was earlier stored,
      determining which data objects of the data item have been modified
      creating data objects for only the data objects that have been modified
      creating a second index object for the data item including in the listing of constituent data objects information about the data objects from the first index object that have not been modified and information about new data objects that represent the data objects that have been modified, the second index object including a parent index object identifier of an earlier version of the data item
      incrementing a reference count value in the index object of the parent of the second index object identified by the parent index object identifier in the second index object
      storing the second index object and the new data objects
      providing a second object identifier for the second index object to the client.

2. The storage system of claim 1 wherein the storage devices are selected from the group including hard disk drives and solid state storage devices.

3. The storage system of claim 1 wherein the storage request includes a link to the data item.

4. The storage system of claim 1 wherein the timestamp refers to a time the first index object was created.

5. The storage system of claim 1 wherein the first index object further includes a parent index object identifier set to null or zero or other designation representing no parent.

6. The storage system of claim 1 wherein the first index object further includes a policy identifier specifying a replication policy for the first index object and its constituent data objects in the data storage system.

7. The storage system of claim 6 wherein storing the first index object and the plurality of data objects and storing the second index object and the new data objects are performed according to the policy identifier.

8. The storage system of claim 1 wherein determining which data objects of the data item have been modified includes comparing the hash values of the constituent data objects of the data item.

9. The storage system of claim 1 wherein creating a second index object for the data item includes obtaining a second timestamp representing a time the second index object was created and including in the second index object the second timestamp.

* * * * *